Nov. 2, 1926.

A. D. KINSEY

STEERING WHEEL

Filed April 3, 1925

1,605,592

Inventor
Arthur D. Kinsey

By Blackmore, Spencer & Hulst
Attorney

Patented Nov. 2, 1926.

1,605,592

UNITED STATES PATENT OFFICE.

ARTHUR D. KINSEY, OF LANSING, MICHIGAN, ASSIGNOR TO GENERAL MOTORS CORPORATION, OF DETROIT, MICHIGAN, A CORPORATION OF DELAWARE.

STEERING WHEEL.

Application filed April 3, 1925. Serial No. 20,436.

This invention relates to improvements in steering wheels.

It is an object of my invention to provide a steering wheel the parts of which can be cheaply manufactured, and which can be assembled in a very simple manner, thus reducing the labor item in the cost of manufacture to a minimum. Specifically, I have provided a steering wheel spider composed of a hub member of very simple construction which can be turned out by an automatic machine and spider arms which may be stamped out of sheet metal, the parts being assembled by placing the ends of the arms in an annular seat in the spider and forcing a flange formed on the hub member above the seat down over the ends of the spider arms thereby firmly locking the parts in assembled relation. To the opposite ends of the spider arms a steering wheel rim of any preferred type may be secured.

Referring now to the drawings.

Figure 1:
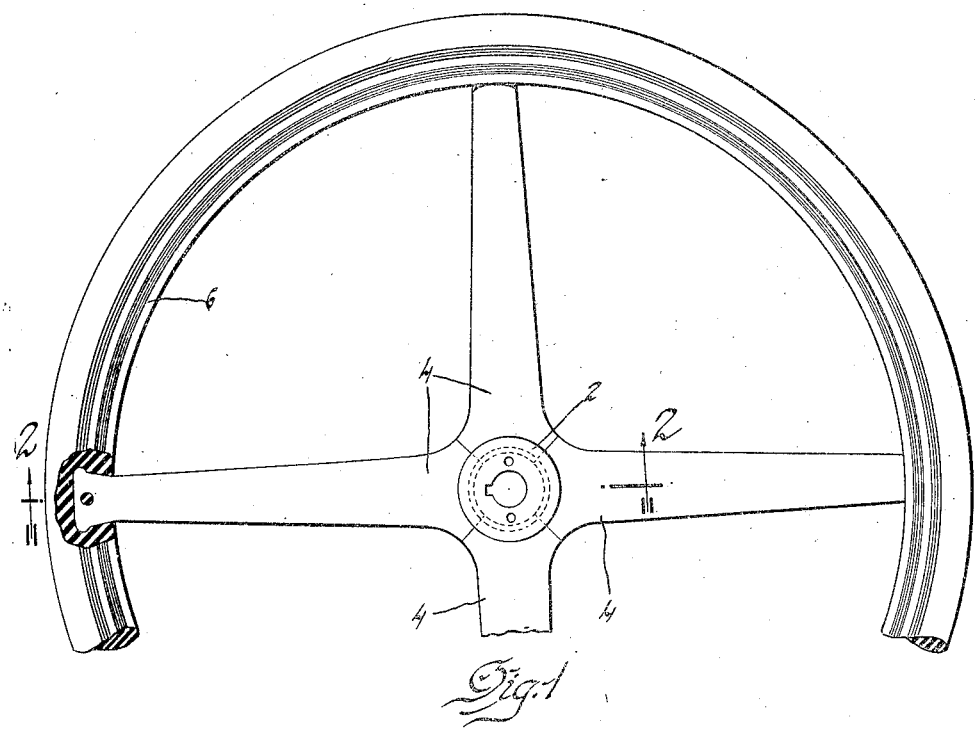
Figure 1 is a partial top plan view of my improved steering wheel, the rim being shown partly broken away to expose the outer end of one of the spider arms.
Figure 2:
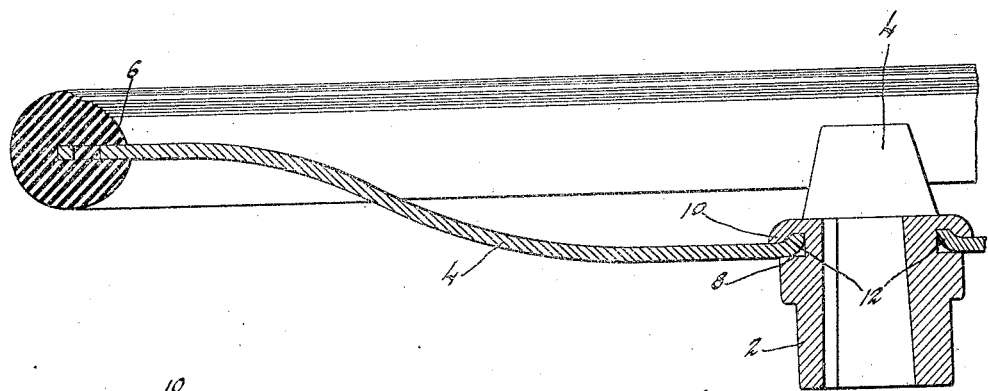
Figure 2 is a sectional view on line 2—2 of Figure 1.
Figure 3:
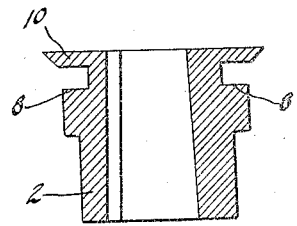
Figure 3 is a detailed view of the hub member.

My improved steering wheel comprises a hub member 2, spider arms 4 and a rim 6. The hub member 2, shown in Figure 3, is, as above stated, an automatic machine product and is provided with a seat 8, preferably annular in form and with a flange 10 above the seat and normally projecting outwardly. The spider arms are stamped out of sheet metal stock and are given a slight upward turn at one end as shown at 12. In assembling the hub with the spider arms the upwardly turned ends of the arms are inserted in the seat, these arms interlocking circumferentially to fill the seat after the manner of the spokes of an artillery wheel; the flange 10 is then subjected to a peening or coining operation and is thus formed down over the ends of the spider arms to firmly hold these arms in the seat. At the same time the interlocking of the flange with the upturned ends of the spider arms hold these arms against longitudinal withdrawal. After this operation is completed the rim may be secured in position in any desired manner. I have preferred to show a rim of plastic material molded in position on the ends of the arms.

Having thus described my invention what I claim and desire to secure by Letters Patent is:

1. A steering wheel comprising a hub member provided with a seat, an arm, one end of which is received in said seat, said end being provided with an abutment, and means integral with said hub member adapted to be forced into engagement with said abutment to hold the arm against withdrawal from the seat.

2. A steering wheel comprising a hub member provided with a plurality of seats, arms having one of their ends received in said seats, said ends being provided with abutments, and means integral with said hub member adapted to be forced into engagement with said abutments to hold the arms against withdrawal from the seats.

3. A steering wheel comprising a hub member provided with a seat, an arm, one end of which is received in said seat, said end being bent at an angle, and means integral with said hub member adapted to be forced over said bent end to hold the arm in the seat.

4. A steering wheel comprising a hub member provided with an annular seat, arms having their ends received in said seat, said ends being bent at an angle, and means integral with said hub member adapted to be formed over said ends to hold said arms in their seats.

5. A steering wheel comprising an integral hub member formed with an annular seat, arms having their ends upturned and received in said seat, a flange on said hub member above said seat and adapted to be formed over to interlock with said upturned ends of said arms to hold said arms in said seat.

6. The combination as set forth in claim 6, and a rim secured to said arms.

In testimony whereof I affix my signature.

ARTHUR D. KINSEY.